United States Patent [19]
Robinson

[11] 3,767,164
[45] Oct. 23, 1973

[54] THROTTLE-SHUTOFF VALVE
[75] Inventor: Bernie E. Robinson, Oak Creek, Wis.
[73] Assignee: Milwaukee Valve Company, Inc.,, Milwaukee, Wis.
[22] Filed: July 1, 1971
[21] Appl. No.: 158,737

[52] U.S. Cl. ............................... 251/122, 251/368
[51] Int. Cl. ...................... F16k 25/04, F16k 47/04
[58] Field of Search ..................... 251/122, 210, 368, 251/121

[56] References Cited
UNITED STATES PATENTS
| | | | |
|---|---|---|---|
| 1,991,052 | 2/1935 | Derby | 251/121 |
| 3,219,311 | 11/1965 | Siver | 251/210 X |
| 2,301,355 | 11/1942 | Armentrout | 251/360 X |
| 1,929,973 | 10/1933 | Haley | 251/122 X |
| 3,391,901 | 7/1968 | Witeelen et al. | 251/368 X |
| 3,160,391 | 12/1964 | Medicus et al. | 251/368 X |

OTHER PUBLICATIONS
1971 Materials Engineering; Materials Selector Issue; Mid-November, 1970; pages 71 and 72

Primary Examiner—Arnold Rosenthal
Attorney—John W. Michael et al.

[57] ABSTRACT

The valve includes both a bevelled plug, which cooperates with a seat assembly to throttle flow, and an annular, flat seating surface surrounding the plug, which seats against a corresponding annular, flat seating surface on the seat assembly when the valve is fully closed. The seating surfaces are made from a hardened material having a Brinell hardness greater than 500 so that the valve is capable of being used to control the flow of high-temperature, high-pressure fluids, such as steam. The hardness of one seating surface is greater than that of the other to minimize galling and the seating surfaces are positioned away from the direct eroding effect of the high velocity flow during throttling, thereby maximizing valve life. The valve and seat assembly can be easily removed for renewal of the flat seating surfaces by relapping or the like.

4 Claims, 2 Drawing Figures

Patented Oct. 23, 1973
3,767,164
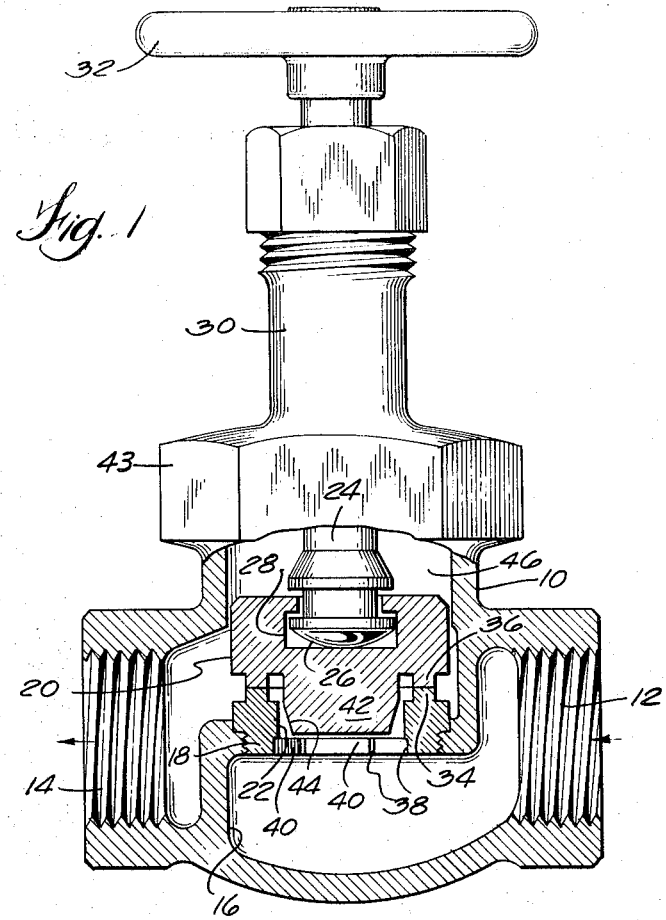
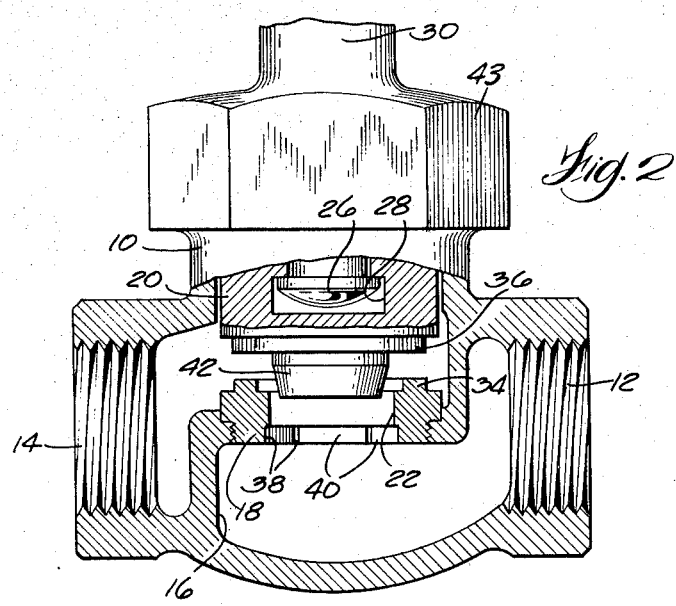
Inventor
Bernie E. Robinson
By Glenn A Buse
Attorney

THROTTLE-SHUTOFF VALVE

BACKGROUND OF THE INVENTION

Valves used for throttling fluid flow typically employ a bevelled plug which cooperates with an annular seat to meter the flow. Fluid flow is shut off when the bevelled section of the plug engages the seat. Valves of this type provide accurate throttling; however, when used in severe service (such as in high pressure steam systems), wear of the seat and plug from the eroding effect of the high velocity flow often causes leakage. The seat and/or plug can be removed and the seating surfaces refinished; however, this remedial action does not always eliminate the leakage problem because the small sealing area between plug and seat requires very precise tolerances to obtain complete sealing. Hence, components of the valve or the complete valve assembly frequently must be replaced. In order to alleviate the problem, it becomes necessary in many systems to employ a separate shutoff valve, acting as a back-up shutoff, which has a relatively wide, flat seat and flat disc. The larger seating area between the seat and the disc provide a greater sealing area and the flat surfaces can be more easily relapped to reinstate the sealing provided thereby. However, shutoff valves of this type do not provide accurate throttling and cannot be used as a throttle valve where accurate control of the flow rate of the fluid is required. Where both shutoff and throttle valves are used, users must maintain an inventory of both types of valves.

SUMMARY OF THE INVENTION

The throttle-shutoff valve described in the Abstract can be used in severe fluid service, such as high pressure steam, and can function as a shutoff valve as well as a throttle valve. This dual capability eliminates the necessity of using separate throttle and shutoff valves to obtain accurate flow control and reliable, leak-free fluid shutoff. Also, this dual capability permits the valve to be used interchangeably with either conventional throttle valves or shutoff valves thereby minimizing inventory requirements for the user. The use of materials having a high Brinell hardness for the seating surfaces with a differential hardness between the two, and arranging these surfaces out of the direct flow of the high velocity fluid during throttling, reduces surface wear thereto and increases the effective seating life of these surfaces. In the event leakage develops, the valve and the seat can be easily removed and the seating surfaces renewed by relapping so the usable life of the valve can be further increased without component replacement.

BRIEF DESCRIPTION OF THE DRAWINGS

FIG. 1 is a side elevation, partially sectioned, view of the throttle-shutoff valve showing the valve in the closed position.

FIG. 2 is a fragmentary view, partially sectioned, showing the valve partially open in a throttling position.

DESCRIPTION OF THE PREFERRED EMBODIMENT

Valve body 10 includes an inlet 12 and an outlet 14 separated by partition 16 into which annular valve seat assembly 18 is threaded. Valve 20 cooperates with seat assembly 18 to control the flow of a high pressure, high temperature fluid (e.g. steam) from inlet 12 to outlet 14 through aperture 22 of the seat assembly. Valve 20 is carried by a stem 24, the lower flanged end 26 of which fits into slotted, undercut recess 28 in the valve. The upper portion of the stem 24 (not shown) is threaded into valve bonnet 30 so that rotation of hand wheel 32, connected to the top of the stem, moves the stem up and down to control the position of valve 20.

Valve seat assembly 18 has a raised, annular, flat seating surface 34, which seats with a corresponding, raised, annular flat seating surface 36 on valve 20 and shuts off fluid flow when the valve is in the closed position as shown in FIG. 1. Both the seating surfaces are made from a hardened metal, such as stainless steel, having a Brinell hardness greater than 500, preferably greater than 550. With this high hardness, the valve can be used for long periods in extremely severe service without significant wear to the seating surfaces and, therefore, without leakage. The two seating surfaces have a different Brinell hardness which minimizes galling and further increases their effective life. Preferably, the seating surface 36 on the valve has the higher Brinell hardness. This difference in Brinell hardness is usually at least 10 and preferably about 50 or higher. For example, the Brinell hardness of seating surface 34 can be about 550 and seating surface 36 about 600.

Valve seat assembly 18 includes small notches 38 and flat surfaces 40 at the lower end of the inside wall of aperture 22 which are arranged to accommodate a wrench or similar tool so that the assembly can be easily removed from the body for relapping seating surface 34. Also, valve 20 can be removed for relapping seating surface 36 by simply loosening bonnet nut 43 (which holds bonnet 32 to valve body 10), separating the bonnet from the valve body and slipping the valve off stem 24. Hence, the flat seating surfaces of the valve and seat assembly are readily accessible for renewal by relapping in the event leakage develops.

When the valve is partially opened as shown in FIG. 2, fluid flow through aperture 22 is throttled by plug section 42 of valve 20. The flow is metered through the area defined between the bevelled section 44 of plug 42 and the inside wall of aperture 22. This metering area varies dependent upon the position of valve 20. Seating surfaces 34 and 36 are not directly exposed to the high velocity fluid flowing through the metering area when the valve is in a throttling position. Therefore, surface wear is reduced and the effective sealing life of these surfaces is increased. Cavity 46, valve body 10 and stem 24 are arranged so that the valve can be raised completely away from seat assembly 18 so that the plug does not throttle flow and there is full fluid flow through aperture 22.

From the above detailed description, it can be seen that the valve of this invention is capable of either accurately controlling the flow rate of a high-temperature, high-pressure fluid or acting as a shutoff valve which provides full flow when completely open. Since the valve can be used either as a shutoff valve or a throttle valve, users need only keep one type of valve in inventory rather than separate ones for each purpose. The ability of the flat seating surfaces of the seat assembly and valve to be renewed by relapping allows the throttle-shutoff valve of this invention to be used to extended periods without replacement of these components or of the entire valve assembly.

I claim:

1. A valve comprising a body having an inlet and outlet separated by a partition;

a seat assembly carried by said partition, said seat assembly including a central aperture having an inner wall defining a generally cylindrical flow passage communicating with said inlet and outlet and further including an annular, renewable, flat-surfaced seating ring surrounding said aperture;

a valve member adapted for reciprocal movement within said body relative to said seat assembly between an open position where there is substantially unrestricted flow through said flow passage and a closed position to shut off flow through said flow passage, said valve member including a beveled plug section adapted to extend into said flow passage without seating against said aperture and to cooperate with said aperture, as said valve member is moved from and towards the closed position, to vary the flow through said flow passage and further including an annular, renewable, flat-surfaced seating ring surrounding said plug section and adapted to engage said seat assembly seating ring and cooperate therewith to provide a fluid tight seal when said valve member is in a closed position, said seat assembly and valve member seating rings being made from a metallic material having a Brinell hardness greater than 500 with the Brinell hardness of one differing from that of the other by at least 10; and means for adjustably moving said valve member between the open and closed position.

2. The valve according to claim 1 wherein the Brinell hardness of said valve member seating ring is at least 10 greater than that of said seating assembly seating ring.

3. The valve according to claim 2 wherein the Brinell hardness of said valve member seating ring is at least 550.

4. The valve according to claim 1 wherein said seat assembly is removably mounted in said partition.

* * * * *